United States Patent Office 3,471,919
Patented Oct. 14, 1969

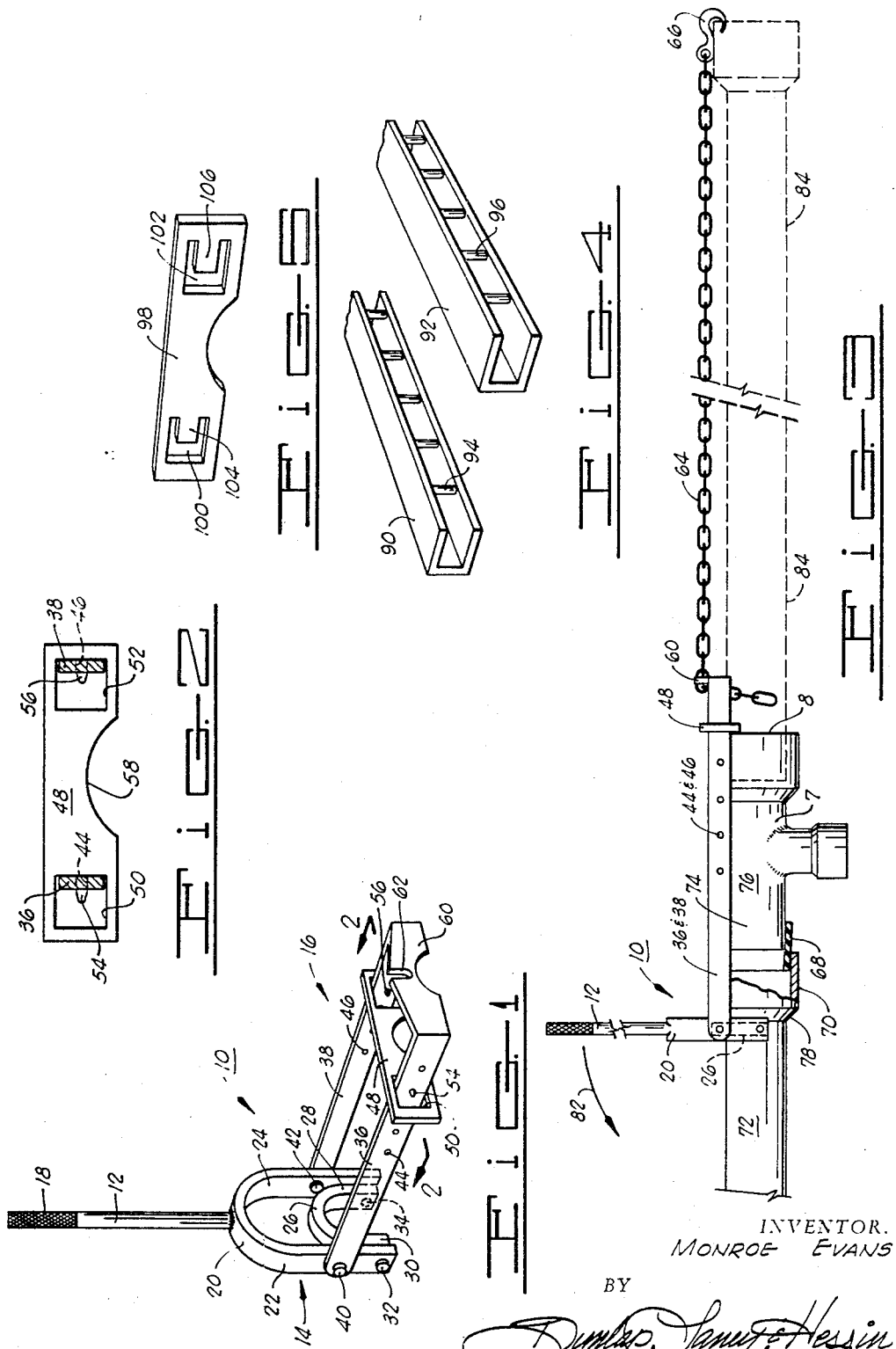

3,471,919
PIPE JOINING DEVICE
Monroe Evans, 1716 S. Everest,
Oklahoma City, Okla. 73129
Filed Apr. 22, 1968, Ser. No. 722,953
Int. Cl. B23p 19/04
U.S. Cl. 29—237                                    4 Claims

ABSTRACT OF THE DISCLOSURE

Apparatus for joining pipe sections of the bell and spigot joint type which consists of a lever and yoke assembly which bears on a bell pipe end to draw a puller assembly which urges the spigot end of a pipe section into engagement with the bell end. The puller assembly is constructed to be of narrow physical dimension with a minimum of moving parts while retaining the capability of being adjustable as to the length of pipe section being joined to a pipe string.

BACKGROUND OF THE INVENTION

Field of the invention

The invention relates generally to pipe pulling apparatus and, more particularly, but not by way of limitation, it relates to improved pipe pulling apparatus for use with well-known types of soil pipe.

Description of the prior art

The prior art includes various types of pipe joining or pulling mechanisms which serve to tightly engage pipe joints of the bell and spigot variety. It has been known that such bell and spigot type joints employing resilient gasket inserts require a relatively great linear force to push a spigot pipe end into a bell pipe end in properly sealed, rigid joinder. Such prior known pipe joining tools are best characterized by U.S. Patents Nos. 3,036,372 and 3,096,572 of recent issue. Each of these patents provides a joining device for use with longer sections of soil pipe or such and such tools are primarily designed for use in joining in situ, i.e. as horizontally disposed along the bottom of a prepared trench. Accordingly, the characteristic structures of the prior teachings as influenced by exigencies of usage are adapted for the joining of longer pipe sections as employed in straight or extended conduit lines.

SUMMARY OF THE INVENTION

The present invention contemplates a pipe pulling apparatus for joining or disconnecting bell and spigot type soil pipe sections of any length and configuration, the apparatus consisting of a lever assembly and a puller assembly which is adjustable in length in accordance with the pipe section to be joined. In a more limited aspect, the invention consists of a handle bar rigidly secured to a lever yoke which is pivotally affixed to opposite sides of a semi-circular brace yoke sized to bear about the outer flange surface of a pipe bell. The lever yoke is pivotally affixed to a pair of side plates supporting a puller plate adjustably therealong such that rotation of the lever yoke about the brace yoke imparts longitudinal motion to the side plates and, therefore, the puller plate which is suitably positioned across the bell end of a pipe section to move it longitudinally.

Therefore, it is an object of the present invention to provide a pipe joining tool for use with sewage pipes and such which can be employed to join or disconnect any length of pipe section in any attitude, i.e. vertical as well as horizontal disposition.

It is a further object of the present invention to provide apparatus which is extremely rugged and compact and which may be used for special function soil pipe sections, such as T's, L's Y's, etc. of varying length, as well as for the longer lengths of pipe sections.

Finally, it is an object of the present invention to provide an apparatus which is easy to employ for joinder or disconnection of cast iron soil pipe sections in closed or tight spaces and in vertical, horizontal, or other attitude.

Other objects and advantages of the invention will be evident from the following detailed description when read in conjunction with the accompanying drawings which illustrate the invention.

BRIEF DESCRIPTION OF THE DRAWINGS

FIG. 1 is a perspective view of the pipe joining device of the invention;
FIG. 2 is a section taken along line 2—2 of FIG. 1;
FIG. 3 is a partially cutaway side view of the pipe joining device in an operational attitude;
FIG. 4 is an alternative form of structure which may be employed in the puller assembly; and
FIG. 5 is a perspective showing of a puller plate which may be employed with the alternative of FIG. 4.

Description of the preferred embodiment

As shown in FIG. 1, a pipe joining device 10 consists of a handle 12 a yoke assembly 14 and a puller assembly 16. The handle 12 consists of a metal bar which may have a knurled gripping portion 18 and the other end is rigidly secured to the bowed end of a U-shaped lever yoke 20 of yoke assembly 14. The lever yoke 20 extends a pair of lever arms 22 and 24 outward and into parallel disposition for pivotal connection. Thus, a semi-circular brace yoke 26 is formed to extend ends 28 and 30 for pivotal connection to the ends of respective lever arms 22 and 24 by means of suitable pivot fasteners 32 and 34.

The puller assembly 16 is pivotally affixed to yoke assembly 14 so that it can be reciprocally moved horizontally. A pair of side plates 36 and 38 are pivotally secured to lever arms 22 and 24 by respective pivot fasteners 40 and 42. The disposition of pivot fasteners 40 and 42 along respective lever arms 22 and 24 will determine the length of stroke and this may be varied in accordance with exigencies of use. That is, pivot fasteners 32 and 34 will actually provide a fulcrum axis such that variation of location of pivot fasteners 40 and 42 will change the length of the effective lever arm and, therefore, the horizontal stroke of puller assembly 16.

Each of side plates 36 and 38 is formed with a plurality of equi-spaced holes 44 and 46 formed therethrough. Each opposed pair of holes 44–46 provide an adjustable positioning for a puller plate 48 thus, as shown in FIG. 2, puller plate 48 is formed with generally square holes 50 and 52 disposed through each side, each of holes 50 and 52 containing a respective pin 54 and 56 rigidly secured in similar orientation therein. Thus, the puller plate 48 receives each of side plates 36 and 38 through respective square holes 50 a nd 52 such that it is slidable therealong except when operatively positioned with respective engaging pins 54 and 56 inserted through a selected pair of holes 44 and 46.

The number and spacing of the plurality of holes 44 and 46 along each of side plates 36 and 38 is a matter of choice as dictated by the primary type of work to be performed. It has been found that a two inch spacing of holes along side plates 36 and 38 to include pipe lengths of about eight to twenty inches should provide a very versatile tool for use in installing nearly all available types of pipe L's, T's, Y's, Traps and other specialized fittings.

It should also be understood that the size of the device 10 can be varied in accordance with the size of cast iron pipe being installed or otherwise handled. Thus, the brace yoke 26 is formed in semi-circular shape and should be slightly larger than the outside radius of the pipe. In like manner, the pulling surface of pulley plate 48, or the distance between side plates 36 and 38, may be kept as narrow as desired so long as the width is sufficient to properly engage a portion of the belled pipe end. The puller plate 48 may be formed with a small cut out portion 58 having a radius the same as the pipe. This allows for the puller plate 48 to engage the bell end of a pipe when it is employed as the pulling surface while allowing additional clearance when employing a second mode of pulling as will be further described below.

An end plate 60 is rigidly secured across the two side plates 36 and 38. End plate 60 may also be employed as a pulling surface for one specific length of pipe; however, it also includes a vertical slot 62 in its upper surface for the purpose of anchoring a chain, cable or other such extension linkage for pulling longer sections of pipe. Thus, as shown in FIG. 3, a chain 64 carrying a hook 66 may be readily employed for joining very long lengths of pipe.

In operation, the pipe joining device 10 can be employed in any attitude to join any length of pipe into a string. FIG. 3 shows the making of a bell and spigot joint of the type which utilizes a neoprene gasket 68 for concentric disposition within the joined surfaces. Thus, a bell end 70 of a pipe section 72 is joined to a spigot end 74 of a specialized T fitting 76. The pipe joining device 10 is placed in its start position after manual alignment of spigot end 74 for insertion in gasket 68 such that base yoke 26 bears around pipe 72 adjacent flange surface 78 of bell section 70. Puller plate 48 will have been arranged in its proper holes 44 and 46 so that it will be placeable to over an arcuate portion of bell end 80 of pipe section 76. The handle 12 can then be manipulated in the direction of arrow 82 to move side plates 36 and 38 longitudinally such that puller plate 48 forces spigot end 74 of pipe section 76 within neoprene gasket 68 which, in turn, is forced within bell end 70 of pipe section 72 to make a sealed, rigid fit. The holes 44 and 46 along respective side plates 36 and 38 provide a plurality of adjustments for positioning puller plate 48 in accordance with whatever the length of pipe section to be joined.

In the event of joining larger pipe sections such as a long pipe length 84 (dash-lines). A linkage such as chain 64 is locked in slot 62 (FIG. 1) of end plate 60 at the proper length to place hook 66 about the bell end of pipe section 84. Similar manipulation of handle 12 in the direction of arrow 82 then serves to join pipe section 84 into gasketed joinder. While other flexible linkage may be employed, the chain 64 is found to be desirable since each individual linkage provides a connector means for insertion down within vertical slot 62 in readily locked manner.

The pipe joining device 10 can also be employed to disconnect previously set pipe sections as for repair, replacement or whatever. Thus, the device 10 can be manipulated to a starting position where handle 12 rests at the extreme in the direction of arrow 82. The brace yoke 26 is positioned on spigot-end 74 of pipe section 76 in bracing contact against bell-end 70. Chain 64 is then wrapped around spigot-end 74 and secured to itself by hook 66 whereupon remaining chain 64 is led up in taut linkage for connection in slot 62 (FIG. 1) of end plate 60. Movement of handle 12 in the direction opposite to arrow 82 forces side plates 36 and 38 away from the pipe joint with chain 64 pulling pipe section 76 out of engagement.

FIG. 4 shows an alternative form of structure which is contemplated for use in forming the puller assembly side plates similar to side plates 36 and 38 of FIG. 1. Thus, the sideplates are formed by a pair of channel members 90 and 92 having a plurality of stops 94 and 96, respectively, welded in equi-spaced location along their open sides. Channels 90 and 92 provide side plates for receiving another type of rugged and readily adjustable puller plate 98 as shown in FIG. 5. The puller plate 98 is formed with oppositely disposed rectangular holes 100 and 102 having similarly oriented tabs 104 and 106 protruding therein. Puller plate 98 can then be adjusted to brace against any selected pair of stops 94 and 96 of channels 90 and 92.

The foregoing discloses novel pipe joining apparatus which allows for operation by a single man to place and join pipe sections of various length, configuration and spatial orientation. The device can be constructed so that it can be used for any size of soil pipe or such and it is readily adjustable for any of various lengths of fitting or conduit section.

Changes may be made in the combination and arrangement of elements as heretofore set forth in this specification and as shown in the drawings; it being understood that changes may be made in the embodiments disclosed without departing from the spirit and scope of the invention as defined in the following claims.

What is claimed is:
1. Apparatus for joining a first pipe section having a bell-type end to a second pipe section having a spigot-type end, comprising:
   a lever yoke having a first end and being bifurcated into generally parallel spaced yoke arms terminating in second ends;
   handle bar means rigidly secured to said lever yoke first end in general alignment with said yoke arms;
   brace yoke means having first and second ends and being formed in semi-circular shape of radius slightly larger than said pipe section spigot-type end;
   fastening means for pivotally connecting each of said lever yoke arms second ends to one of said first and second ends of the brace yoke means;
   first and second side plate means each having one end pivotally affixed to respective lever yoke arms at a point between said lever yoke first end and the respective second ends, said first and second sideplate means being spaced apart no further than the outside diameter of said pipe section bell-type end; and
   puller plate means adjustably affixed across said first and second sideplate means at a predetermined distance from the pivotally affixed ends of said side plate means.

2. Apparatus as set forth in claim 1 which is further characterized to include:
   end plate means rigidly secured between said first and second side plate means, said end plate means having a vertical slot formed through one side; and
   puller means including a hook for fastening to the bell-type end of a pipe section and including a flexible linkage means secured to said hook and rigidly held in said vertical slot of the end plate means.

3. Apparatus as set forth in claim 1 which is further characterized in that:
   said first and second plate means each have a plurality of spaced holes formed horizontally therethrough; and
   said puller plate means includes a pair of openings, each of which surrounds one of the first and second plate means, and each of which includes a projection rigidly secured to said plate means and extending into a respective opening such that the projections can be placed in a selected pair of holes in said first and second plate means to hold said puller plate means at a preset position along said first and second plate means.

4. Apparatus as set forth in claim 2 which is further characterized in that:

said first and second plate means each have a plurality of spaced holes formed horizontally therethrough; and said puller plate means includes a pair of openings, each of which surrounds one of the first and second plate means, and each of which includes a projection rigidly secured to said plate means and extending into a respective opening such that the projections can be placed in a selected pair of holes in said first and second plate means to hold said puller plate means at a preset position along said first and second plate means.

References Cited

UNITED STATES PATENTS

| | | | |
|---|---|---|---|
| 870,931 | 11/1907 | Claiborne | 29—237 |
| 1,870,607 | 8/1932 | Crane | 254—29 |
| 1,894,835 | 1/1933 | Smith | 29—234 |
| 2,122,099 | 6/1938 | Jeffrey | 254—29 X |
| 2,958,125 | 11/1960 | Nichols | 29—237 |

FOREIGN PATENTS 85,676    2/1936    Sweden.

ROBERT C. RIORDON, Primary Examiner

J. C. PETERS, Assistant Examiner